United States Patent
Singh

(10) Patent No.: US 10,242,263 B1
(45) Date of Patent: Mar. 26, 2019

(54) VIRTUAL ASSISTANT OF SAFE LOCKER

(71) Applicant: Wells Fargo Bank, N.A., San Francisco, CA (US)

(72) Inventor: Manpreet Singh, Guwahati (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 15/812,155

(22) Filed: Nov. 14, 2017

(51) Int. Cl.
*G06K 9/00* (2006.01)
*G06F 21/32* (2013.01)
*G08B 13/196* (2006.01)
*H04N 7/18* (2006.01)

(52) U.S. Cl.
CPC ......... *G06K 9/00671* (2013.01); *G06F 21/32* (2013.01); *G08B 13/19656* (2013.01); *H04N 7/183* (2013.01)

(58) Field of Classification Search
CPC ............... G06K 9/00671; G06F 21/32; G08B 13/19656; H04N 7/183
See application file for complete search history.

(56) References Cited

U.S. PATENT DOCUMENTS

| 9,317,987 B2 | 4/2016 | Cleveland et al. |
| 2007/0271596 A1 | 11/2007 | Boubion et al. |
| 2015/0332528 A1 | 11/2015 | McGinnis et al. |
| 2017/0103643 A1 | 4/2017 | Powers et al. |
| 2018/0033235 A1* | 2/2018 | Dotterweich ...... G07C 9/00896 |
| 2018/0232771 A1* | 8/2018 | Lenahan ............ G06Q 20/3224 |

FOREIGN PATENT DOCUMENTS

| CN | 102852426 | 1/2013 |
| CN | 203654991 | 6/2014 |
| CN | 105298298 | 2/2016 |
| CN | 105611616 | 5/2016 |
| WO | 2010106552 | 9/2010 |

* cited by examiner

*Primary Examiner* — Francis Geroleo
(74) *Attorney, Agent, or Firm* — Walter Haverfield LLP; James J. Pingor

(57) ABSTRACT

The innovation disclosed and claimed herein, in one aspect thereof, comprises systems and methods of providing digital access to safety deposit boxes. The systems and methods provide a portal to digitally access a locker by a user. The systems and methods receive a request to access the locker from the user and authenticate the user to provide access. The systems and methods receive a trigger to capture an image of the locker and capture an image of the interior of the locker. The systems and methods identify items within the locker using recognition algorithms; and associate the items with identified labels. The systems and methods annotate the captured image with the identified labels, wherein the annotations are overlaid onto the capture image to create an augmented reality image of the locker. The systems and methods send the image to the user on a user device associated with the user.

14 Claims, 5 Drawing Sheets

VIRTUAL ASSISTANT OF SAFE LOCKER

BACKGROUND

Safety deposit boxes are common tools for customers at almost any branch of a financial institution. The safety deposit boxes provide a physical locker that keep important documents, valuables, and/or the like safe and secure from thieves, accidental damage, and/or the like. However, the safety deposit box is a physical element that requires customers to physically be at the branch to access the locker and know what is contained within it. Oftentimes, a customer will make a special visit to the branch out of the customer's way just to verify their belongings are safe and still within the locker. There is a user for a customer to have visual access to the locker to confirm their belongings are safe and know what is in the locker.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of providing digital access to safety deposit boxes. The systems and methods provide a portal to digitally access a locker by a user. The systems and methods receive a request to access the locker from the user and authenticate the user to provide access. The systems and methods receive a trigger to capture an image of the locker and capture an image of the interior of the locker. The systems and methods identify items within the locker using recognition algorithms; and associate the items with identified labels. The systems and methods annotate the captured image with the identified labels, wherein the annotations are overlaid onto the capture image to create an augmented reality image of the locker. The systems and methods send the image to the user on a user device associated with the user.

In aspects, the subject innovation provides substantial benefits in terms of access to safety deposit boxes and user experience. One advantage resides in access to safety deposit boxes without a physical presence. Another advantage resides in a more secure knowledge of what is contained within a safety deposit box.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
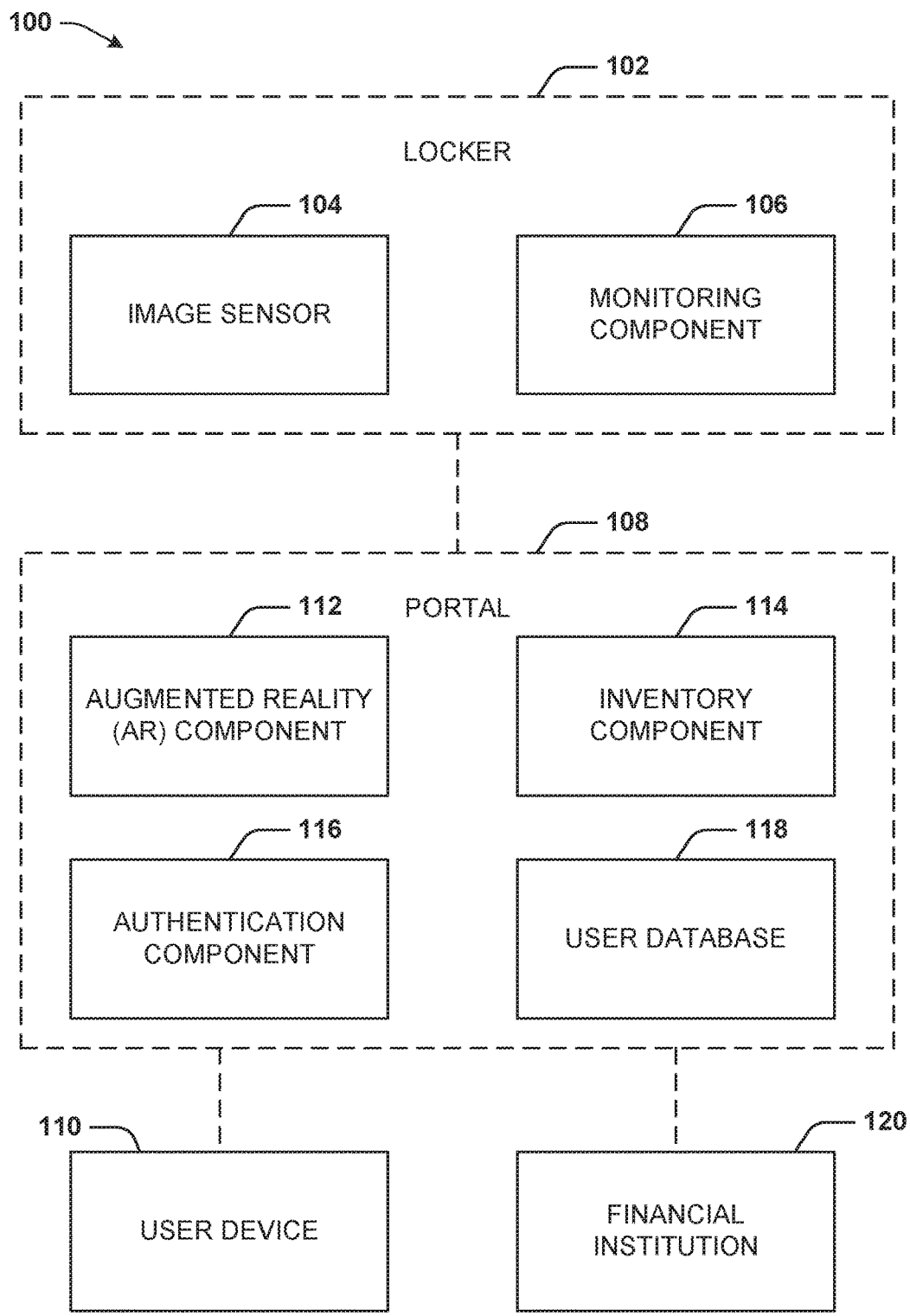
FIG. 1 illustrates an example component diagram of a system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

FIG. 1 illustrates an example component diagram of a system 100 for providing augmented locker images to a user. The system 100 includes a locker 102. The locker 102 is a secured space and/or area that can be locked via a locking mechanism (not shown) and/or the like. The locker 102 can be a safety deposit box, secure locker, lockbox, safe, vault, and/or the like. In some embodiments, the locker 102 is a safety deposit box associated with a financial institution and is physically located in a vault of a branch of the financial institution.

The locker 102 includes an image sensor 104. The image sensor 104 can be a still image camera, video camera, and/or the like to capture images of the locker 120. In some embodiments, the image sensor 104 can be permanently attached within the locker 102 or temporarily attached within the locker 102. The image sensor 104 captures an image of the interior of the locker to document the contents within the locker. In some embodiments, the locker 102 can include multiple or an array of image sensors 104 to provide different viewing angles of the locker 102 interior.

In other embodiments, a three dimensional image can be created of the interior of the locker 102. The three dimensional image can be created using multiple cameras or three dimensional image analysis. The image analysis can make reasonable inferences to create a three dimensional image of the locker 102. The three dimensional image can be navigated by a user viewing the image to access different views of items within the locker 102.

In some embodiments, the image sensor 104 can be triggered to capture an image over a network by a third party entity. The locker 102 can include a monitoring component 106. The monitoring component 106 can determine the locker 102 has been accessed. In some embodiments, the monitoring component 106 detects movement of the locker 102 to determine the locker 102 has been moved. In other embodiments, the monitoring component 106 is a light sensor to detect when the locker 102 is or has been opened. In another embodiment, the monitoring component 106 is connected to the locking mechanism of the locker 102 to determine when the locker 102 has been unlocked and/or locked. The monitoring component 106 determines a change condition of the locker 102 and can trigger the image sensor 104 to capture an image of the interior of the locker 102. In other embodiments, the image sensor 104 can be scheduled to capture an image of the locker 102 either periodically or a scheduled date/time.

The system 100 includes a portal 108. The portal 108 can be an access point for a user associated with the locker 102 to view images of the locker 102 captured by the image sensor 104. In some embodiments, the portal 108 is a web site accessible over servers and/or the internet. The image sensor 104 captures an image of the interior of the locker 102 and provides the image and/or image data to the portal 108. The portal 108 can be accessed by a user device 110 associated with the user. The portal 108 can provide the images associated with the user's locker 102 to the user device 110.

In some embodiments, the image sensor 104 and/or the locker 102 can receive a request to capture an image of the locker 102 from a user via a user device 110. The user provides the request which triggers the image sensor 104 to capture an image and provide an image and/or an augmented image described below.

The portal 108 includes an augmented reality (AR) component 112. The AR component 112 receives an image(s) from the image sensor 104 via the locker 102 and/or the portal 108. The AR component 112 analyzes an image of the locker 102 for identification of items within the locker 102. The AR component 112 utilizes identification algorithms to tag or recognize items within the locker.

The AR component 112 can generate an augmented image having a user interface overlaid on the original image that displays tags for identified items within the locker 102. For example, a user places an engagement ring and a passport within the locker 102. An image is captured of the engagement ring and passport within the interior of the locker 102. The AR component 112 receives and analyzes the image to identify and tag the engagement ring as "Ring" and the passport as "Passport." The AR component 112 overlays the tags onto the image to create an augmented image. The user can access the augmented image via the portal 108 to view the augmented image on their user device 110.

In some embodiments, the AR component 112 can augment the image according to a privacy (or redaction) selection. A user (or customer) may want to redact private documents or personal items so that the AR component 112 does not identify the items or the redacted items cannot be viewed via the portal 108. In some embodiments, the privacy selection is made by a user. The user can view the image taken of the interior of the locker and make selections to items to redact or exclude from the image.

For example, the user has a will within his locker that he does not want to appear in the augmented image out of privacy concerns. The user locates the will in the image and selects the will to be redacted. In some embodiments, the user can define boundaries within the image to be redacted. In other embodiments, the user can receive an identification of the will from the AR component 112, and select the identified will to be redacted.

The AR component 112 can redact items by changing the pixels within the image associated with the item. For example, the items can be redacted by a blurring function to hide details of the item. In an alternate example, the item's pixels can be changed to black to block all details of item from being viewed in the image.

In other embodiments, the AR component 112 can receive a privacy level selection from a user. The privacy level can be low, medium, or high. The AR component 112 determines items to be redacted from the augmented image based on the privacy level selection. The AR component 112 redacts one or more items within the image such that the one or more items do not appear in the annotated image.

The portal 108 includes an inventory component 114. The inventory component 114 can create and store a list of items within the locker 102. The inventory component 114 receives the created tags from the AR component 112 and compiles a list that is associated with the user. The user may access the list via the portal 108 and/or inventory component 114. In some embodiments, the inventory component 114 can generate an email, and/or notification and communicate the list to the user and/or the user device 110.

The portal 108 includes an authentication component 116. When a user attempts to access the portal 108 to view images of the locker 102, the user may be authenticated by the authentication component 116. The authentication component 116 can receive a password associated with the user. User data such as passwords, login names, locker number, account information, biometric data, and/or the like can be stored in a user database 118. In some embodiments, the authentication component 116 can match user biometric data to stored biometric data in the user database 118 to determine or confirm the identity of the payee and/or payer. In some embodiments, the authentication component 116 authenticates the user and the portal 108 retrieves account information from the financial institution 118 or financial institution server to determine the locker 102 associated with the user.

Figure 2:
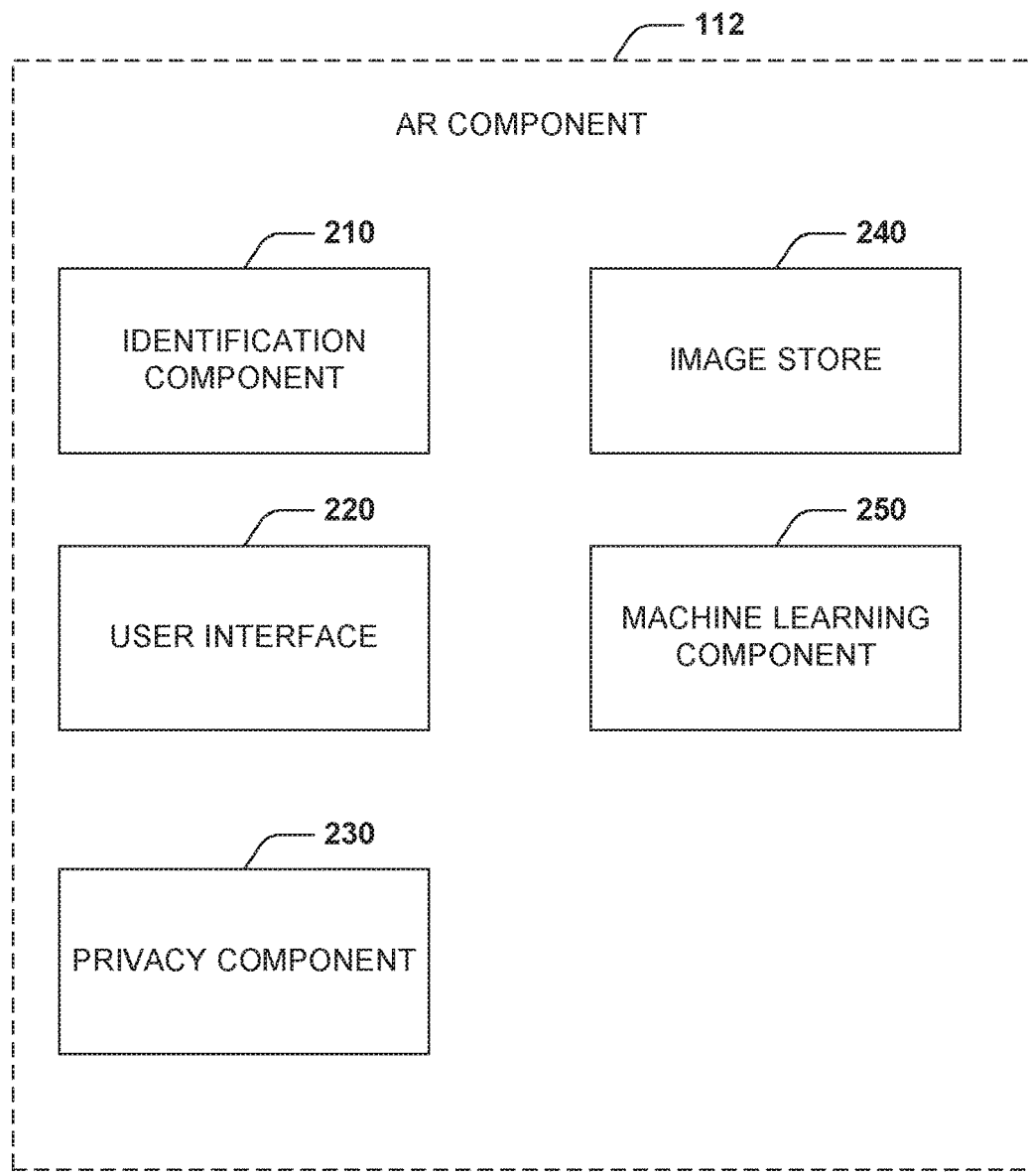
FIG. 2 illustrates an example component diagram of an augmented reality component.

FIG. 2 illustrates a detailed component diagram of the AR component 112. The AR component 112 receives an image(s) from the image sensor 104 via the locker 102 and/or the portal 108. The AR component 112 includes an identification component 210 that analyzes an image of the locker 102 for identification of items within the locker 102. The identification component 210 utilizes identification algorithms to tag or recognize items within the locker 102.

The AR component 112 includes a user interface 220 that can generate an augmented image having tags overlaid on the original image that displays tags for identified items within the locker 102. For example, a user places an engagement ring and a passport within the locker 102. An image is captured of the engagement ring and passport within the interior of the locker 102. The AR component 112 receives and analyzes the image to identify and tag the engagement ring as "Ring" and the passport as "Passport." The AR component 112 overlays the tags onto the image to create an augmented image. The user can access the augmented image via the portal 108 to view the augmented image on their user device 110.

The AR component 112 can include a privacy component 230. In some embodiments, the privacy component 230 can augment the image according to a privacy (or redaction) selection. A user (or customer) may want to redact private documents or personal items so that the AR component 112 does not identify the items and maintains the user's privacy. In some embodiments, the privacy component 230 receives a privacy selection made by a user. The user can view the image taken of the interior of the locker and make selections to items to redact or exclude from the image via the privacy component 230. For example, the user has a will within his locker that he does not want to appear in the augmented image. The user uses the privacy component 230 to locate the will in the image and selects the will to be redacted.

In some embodiments, the privacy component 230 can receive boundaries within the image to be redacted. For example, the privacy component 230 receives a boundary drawn around an item to be redacted by the user. The privacy 230 can redact all items within the boundary or infer an item to be removed within the drawn boundary to allow for an error correction of the user drawn boundary.

In other embodiments, the user can receive an identification of the will from the AR component 112, and select the identified will to be redacted. The privacy component 230 receives the boundaries or the privacy selections and redacts the augmented image of the locker such that the items cannot be seen in the image. The privacy component 230 can define pixels within the image for redaction based on the received selections and change the pixels such that the items are redacted.

In other embodiments, the privacy component 230 can receive a privacy level selection from a user. The privacy level can be low, medium, or high. The AR component 112 determines items to be redacted from the augmented image based on the privacy level selection. The AR component 112 redacts one or more items within the image such that the one or more items do not appear in the annotated image.

The AR component 112 includes an image store 240. The augmented images can be stored in the image store 240 to be provided to a user and/or to facilitate future augmented images of the locker 102 associated with the user or other lockers. The image store 240 stores the tags and relevant associations such as user, locker identification, financial institution, location, and/or the like. In some embodiments, the image store 240 can store an augmented image that is stripped of associations to facilitate future identification of items in other lockers not associated with the user.

The AR component 112 can include a machine learning component 250.

The machine learning component 250 can train the identification component 210 to better recognize items in the locker 102. In some embodiments, the machine learning component 250 can be locker specific to the user where the machine learning component 250 can use previous images of the same locker to facilitate identification of items within the same locker. In other embodiments, the machine learning component 250 can be general to the images to train the identification component 210 to identify similar items in other lockers having images to be augmented.

Figure 3:
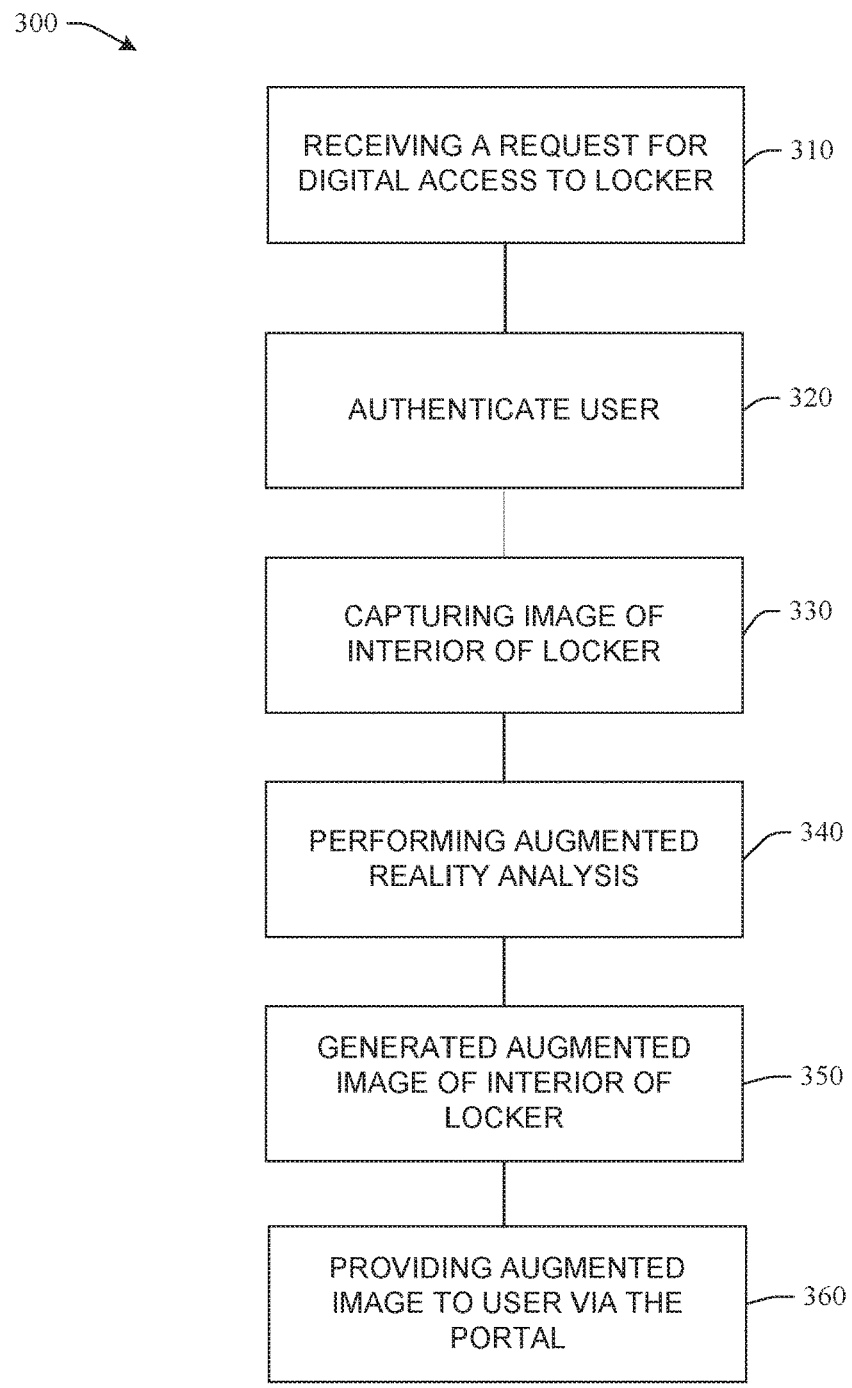
FIG. 3 illustrates a method for providing augmented locker images to a user.

With reference to FIG. 3, example methods 300 are depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 300 are described in conjunction with a specific example is for explanation purposes.

FIG. 3 illustrates a method 300 for providing augmented images for a safe locker. The method 300 can begin at 310 by receiving a request from a user for digital access to a locker associated with the user. The request can be made on a user device that is connected to a portal used to provide access to images of lockers. At 320, the user is authenticated. The user can be authenticated via password, one time passcode sent to user device, multi-factor authentication, biometric authentication, and/or the like. The authentication ensures a user can only access the locker(s) associated with the user and not anybody else. The authentication also ensures a person other than the user associated with the locker can access images of the locker.

At 330, an image of the interior of the user's locker is captured. In this embodiment, the capture is triggered by the user after being authenticated. The trigger ensures that the most recent images of the locker are provided to the user. Other conditions to capture an image of the locker are described in detail above. At 340, the captured image is analyzed using augmented reality and/or identification algorithms. The analysis can identify items within the captured image and located within/inside the locker.

At 350, an augmented image is generated from the analysis, tags, and original image. The augmented image can include tagging parts of the image as part of an identified item. The tagging can include associating a set of pixels in the image that include the identified item with a tag. The tag can appear overlaid on top of the image to annotate the image when viewed, scrolled/moused over, selected, and/or the like. In some embodiments, the augmented image can be interactive.

At 360, the augmented image is provided and/or displayed to the user via the portal and/or the user device. The augmented image can be sent to the user device and viewed on the user device in a augmented reality viewer, browser, and/or the like. The augmented image can be sent via the portal while the user is connected to the portal. In some embodiments, the user may correct or fix incorrect tags or identifications. In other embodiments, the user may provide a unique identification or tag for an item and change the tag. The changes or fixes may be stored in an inventory, image store, and/or the like. A machine learning component may use corrections to facilitate future identifications by an AR component and/or identification component.

Figure 4:
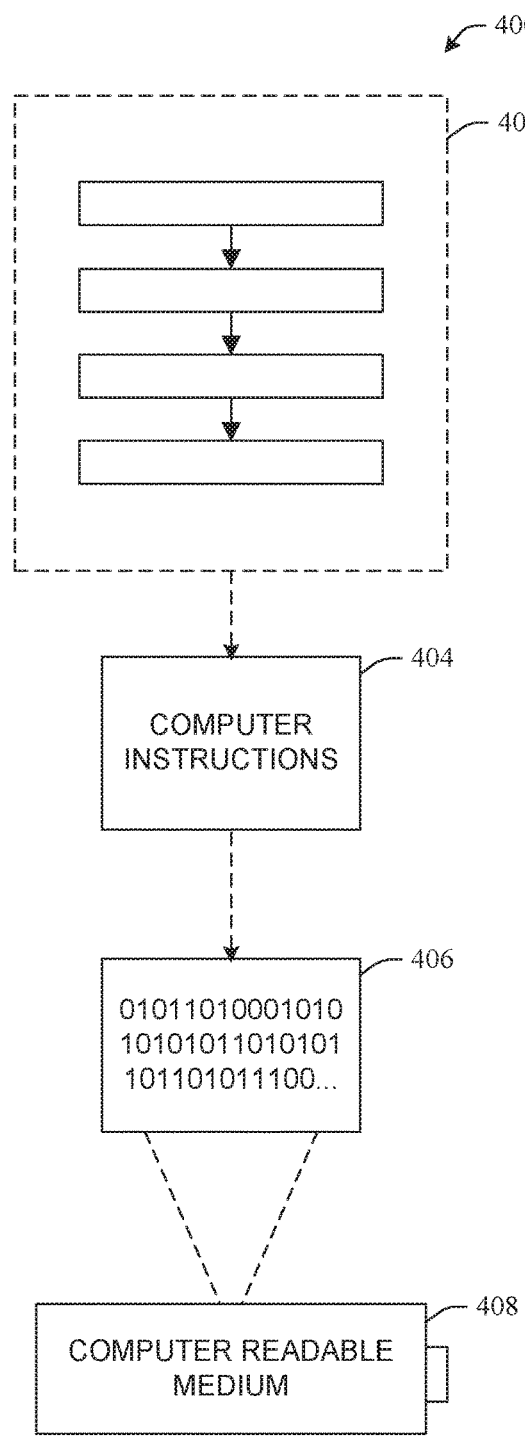
FIG. 4 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 4, wherein an implementation 400 comprises a computer-readable medium 408, such as a CD-R, DVD-R, flash drive, a platter of a hard disk drive, etc., on which is encoded computer-readable data 406. This computer-readable data 406, such as binary data comprising a plurality of zero's and one's as shown in 406, in turn comprises a set of computer instructions 404 configured to operate according to one or more of the principles set forth herein. In one such embodiment 400, the processor-executable computer instructions 404 is configured to perform a method 402, such as at least a portion of one or more of the methods described in connection with embodiments disclosed herein. In another embodiment, the processor-executable instructions 404 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 5:
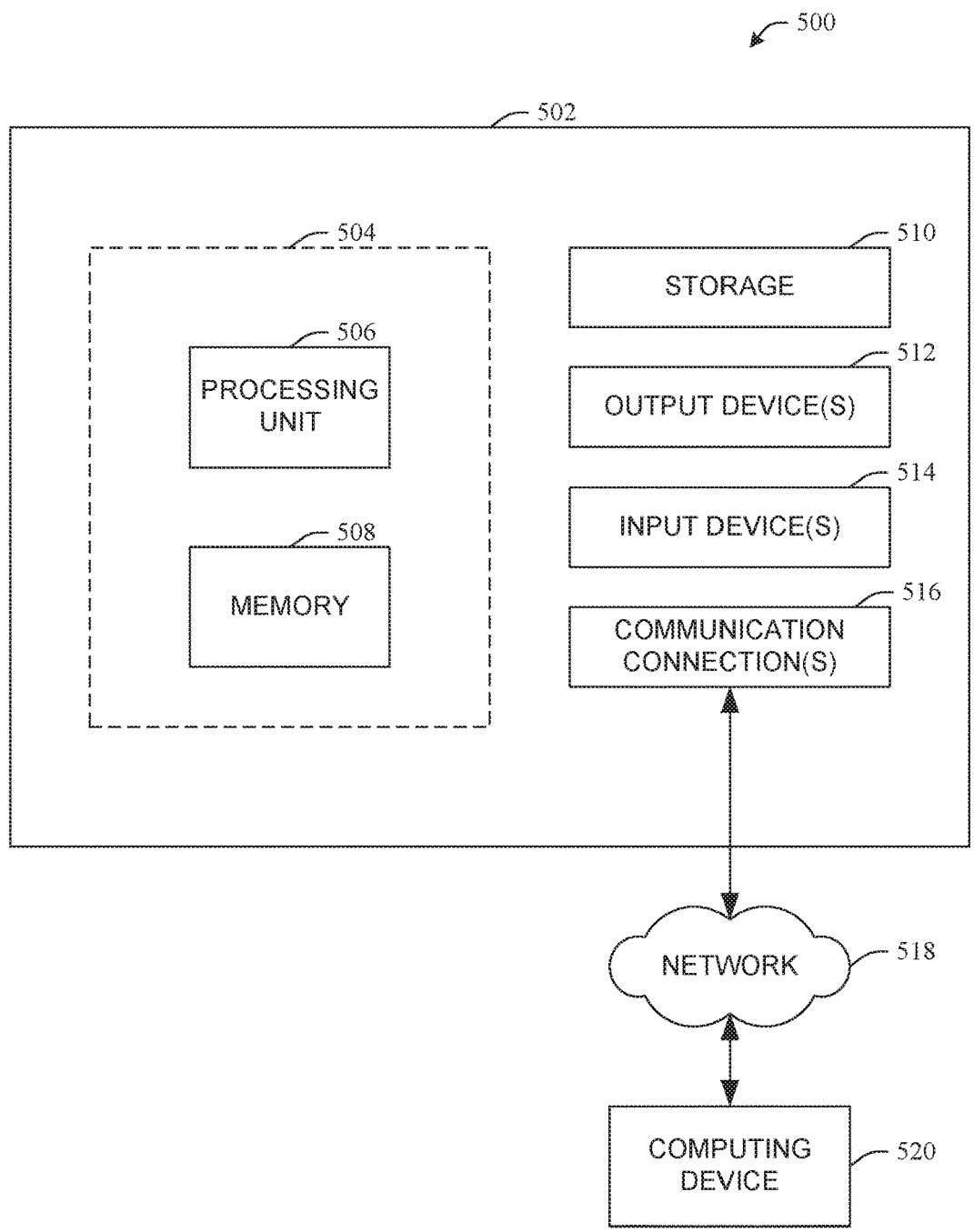
FIG. 5 illustrates a computing environment where one or more of the provisions set forth herein can be implemented, according to some embodiments.

With reference to FIG. 5 and the following discussion provide a description of a suitable computing environment in which embodiments of one or more of the provisions set forth herein can be implemented. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 5 illustrates a system 500 comprising a computing device 502 configured to implement one or more embodiments provided herein. In one configuration, computing device 502 can include at least one processing unit 506 and memory 508. Depending on the exact configuration and type of computing device, memory 508 may be volatile, such as RAM, non-volatile, such as ROM, flash memory, etc., or some combination of the two. This configuration is illustrated in FIG. 5 by dashed line 504.

In these or other embodiments, device 502 can include additional features or functionality. For example, device 502 can also include additional storage such as removable storage or non-removable storage, including, but not limited to, magnetic storage, optical storage, and the like. Such additional storage is illustrated in FIG. 5 by storage 510. In some embodiments, computer readable instructions to implement one or more embodiments provided herein are in storage 510. Storage 510 can also store other computer readable instructions to implement an operating system, an application program, and the like. Computer readable instructions can be accessed in memory 508 for execution by processing unit 506, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 508 and storage 510 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 502. Any such computer storage media can be part of device 502.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 502 can include one or more input devices 514 such as keyboard, mouse, pen, voice input device, touch input device, infrared cameras, video input devices, or any other input device. One or more output devices 512 such as one or more displays, speakers, printers, or any other output device can also be included in device 502. The one or more input devices 514 and/or one or more output devices 512 can be connected to device 502 via a wired connection, wireless connection, or any combination thereof. In some embodiments, one or more input devices or output devices from another computing device can be used as input device(s) 514 or output device(s) 512 for computing device 502. Device 502 can also include one or more communication connections 516 that can facilitate communications with one or more other devices 520 by means of a communications network 518, which can be wired, wireless, or any combination thereof, and can include ad hoc networks, intranets, the Internet, or substantially any other communications network that can allow device 502 to communicate with at least one other computing device 520.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
providing a locker that is accessible via a portal, wherein the locker facilitates storage of a plurality of items;
capturing an image of an interior of the locker such that the image frames the plurality of items;
performing augmented reality analysis on the captured image; and
providing access to the image via the portal, wherein the portal provides an encrypted data representation of each of the subset of the plurality of items,
wherein the augmented reality analysis includes:
identifying items within the locker using recognition algorithms;
associating the items with identified labels;
annotating the captured image with the identified labels, wherein the annotations are overlaid onto the capture image to create an augmented reality image of the locker;
receiving a privacy level selection;
determining items to be redacted from the annotated image based on the privacy level selection; and
redacting one or more items within the annotated image such that the one or more items do not appear in the annotated image.

2. The method of claim 1, comprising: determining an inventory list consisting of the identified items in the locker.

3. The method of claim 2, comprising:
automatically updating the inventory list upon detecting access to the locker.

4. The method of claim 3, comprising:
detecting physical access to the locker;
automatically triggering a new captured image of the locker upon determining the physical access has been completed.

5. The method of claim 1, comprising:
receiving a request to access the image of the locker via the portal; and
authenticating a user associated with the locker.

6. The method of claim 5, wherein the authentication comprises:
receiving one or more credentials associated with the user; and
receiving one or more biometrics of the user to authenticate the user.

7. A system, comprising:
a locker that can hold one or more items for a user;
a image sensor that captures an image of the interior of the locker such that the image frames the one or more items;
an augmented reality component that performs augmented reality analysis on the captured image; and a portal that provides digital access to the image;
wherein the augmented reality component comprises:
an identification component that:
identifies items within the locker using recognition algorithms; and
associates the items with identified labels;
wherein the augmented reality component comprises:
a user interface that annotates the captured image with the identified labels, wherein the annotations are overlaid onto the capture image to create an augmented reality image of the locker;
wherein the augmented reality component comprises:
a privacy component that:
receives a privacy level selection;
determines items to be redacted from the annotated image based on the privacy level selection; and
redacts one or more items within the annotated image such that the one or more items do not appear in the annotated image.

8. The system of claim 7, comprising:
wherein the image sensor can capture a three dimensional image of the locker.

9. The system of claim 7, comprising: an inventory component that determines an inventory database of the identified items in the locker.

10. The system of claim 9, comprising:
wherein the inventory component automatically updates the inventory list upon detecting changes within the locker.

11. The system of claim 10, comprising:
a monitoring component that detects physical access to the locker;
wherein the image sensor captures an image of the locker upon the monitoring component determining the physical access has been completed.

12. The system of claim 7, comprising:
wherein the portal receives a request to access the image of the locker from a user; and
an authentication component that authenticates the identity of the user associated with the locker.

13. The system of claim 12, wherein the authentication component receives one or more credentials associated with the user, and one or more biometrics of the user to authenticate the user.

14. A non-transitory computer readable medium, comprising instructions to control one or more processors configured to:
provide a portal to digitally access a locker by a user;
receive a request to access the locker from the user;
authenticate the user to provide access;
receive a trigger to capture an image from the portal;
capture an image of the interior of the locker; and
send the image to the user on a user device associated with the user;
wherein the one or more processors are further configured to:
identify items within the locker using recognition algorithms; and
associate the items with identified labels; and
annotate the captured image with the identified labels;
wherein the annotations are overlaid onto the capture image to create an augmented reality image of the locker;
receive a privacy level selection;
determine items to be redacted from the annotated image based on the privacy level selection; and
redact one or more items within the annotated image such that the one or more items do not appear in the annotated image.

* * * * *